(12) United States Patent
Prusty et al.

(10) Patent No.: US 8,466,221 B2
(45) Date of Patent: Jun. 18, 2013

(54) POLYAMIDES THAT RESIST HEAT-AGING

(75) Inventors: Manoranjan Prusty, Mannheim (DE); Maxim Peretolchin, Mannheim (DE); Martin Baumert, Dossenheim (DE)

(73) Assignee: BASF SE (DE)

( * ) Notice: Subject to any disclaimer, the term of this patent is extended or adjusted under 35 U.S.C. 154(b) by 178 days.

(21) Appl. No.: 13/042,723

(22) Filed: Mar. 8, 2011

(65) Prior Publication Data

US 2011/0224347 A1  Sep. 15, 2011

Related U.S. Application Data

(60) Provisional application No. 61/311,795, filed on Mar. 9, 2010.

(51) Int. Cl.
- *C08K 3/10* (2006.01)
- *C08K 5/3477* (2006.01)
- *C08G 73/00* (2006.01)

(52) U.S. Cl.
USPC ........... 524/413; 524/100; 524/440; 524/538; 528/423

(58) Field of Classification Search
USPC .................. 523/100, 413, 440, 538; 524/100, 524/413, 440, 538; 528/423
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 3,393,210 A | 7/1968 | Speck | |
| 4,148,846 A | 4/1979 | Owens et al. | |
| 4,360,617 A | 11/1982 | Muller et al. | |
| 4,537,949 A | 8/1985 | Schmidt et al. | |
| 4,540,772 A | 9/1985 | Pipper et al. | |
| 4,771,109 A | 9/1988 | Eichenauer et al. | |
| 4,882,381 A | 11/1989 | Wittmann et al. | |
| 5,010,135 A | 4/1991 | Eckel et al. | |
| 5,298,595 A | 3/1994 | Reimann et al. | |
| 6,194,538 B1 | 2/2001 | Weiss et al. | |
| 6,699,960 B1 | 3/2004 | Ohlbach et al. | |
| 2006/0235191 A1 | 10/2006 | Deininger et al. | |
| 2006/0247339 A1* | 11/2006 | Harashina et al. | 524/100 |
| 2008/0146717 A1 | 6/2008 | Gijsman et al. | |
| 2009/0012229 A1 | 1/2009 | Desbois et al. | |
| 2009/0127740 A1* | 5/2009 | Kirchner | 264/272.11 |

FOREIGN PATENT DOCUMENTS

| | | |
|---|---|---|
| DE | 2702661 A1 | 8/1977 |
| DE | 3725576 A1 | 2/1989 |
| DE | 3800603 A1 | 7/1989 |
| DE | 10313681 A1 | 10/2004 |
| EP | 0038094 A2 | 10/1981 |
| EP | 0038582 A2 | 10/1981 |
| EP | 0039524 A1 | 11/1981 |
| EP | 0050265 A1 | 4/1982 |
| EP | 129195 A2 | 12/1984 |
| EP | 129196 A2 | 12/1984 |
| EP | 235690 A2 | 9/1987 |
| EP | 0240867 A1 | 10/1987 |
| EP | 299444 A2 | 1/1989 |
| EP | 319290 A2 | 6/1989 |
| EP | 922065 A2 | 6/1999 |
| EP | 1198491 A1 | 4/2002 |
| EP | 1846506 A1 | 10/2007 |
| EP | 1994075 A2 | 11/2008 |
| WO | WO-98/08889 A2 | 3/1998 |
| WO | WO-00/17171 A1 | 3/2000 |
| WO | WO-01/09224 A1 | 2/2001 |
| WO | WO-2005/007727 A1 | 1/2005 |
| WO | WO-2006/074912 A1 | 7/2006 |
| WO | WO-2006/074934 A1 | 7/2006 |
| WO | WO-2007/101809 A2 | 9/2007 |
| WO | WO-2008/148766 A1 | 12/2008 |
| WO | WO-2009/027186 A2 | 3/2009 |
| WO | WO-2009/080787 A1 | 7/2009 |

* cited by examiner

*Primary Examiner* — Tae H Yoon
(74) *Attorney, Agent, or Firm* — Novak Druce Connolly Bove + Quigg LLP

(57) ABSTRACT

Thermoplastic molding compositions, comprising
A) from 10 to 98% by weight of a thermoplastic polyamide,
B) from 0.01 to 20% by weight of a highly branched melamine polymer or melamine-urea polymer, or a mixture of these,
C) from 0 to 70% by weight of further additives,
where the total of the percentages by weight of components A) to C) is 100%.

20 Claims, No Drawings

POLYAMIDES THAT RESIST HEAT-AGING

CROSS REFERENCE TO RELATED APPLICATIONS

This application is a non-provisional application, which claims benefit to U.S. provisional application 61/311,795, filed Mar. 9, 2010, the entire disclosure of which is hereby incorporated by reference.

The invention relates to thermoplastic molding compositions, comprising

A) from 10 to 98% by weight of a thermoplastic polyamide,
B) from 0.01 to 20% by weight of a highly branched melamine polymer or melamine-urea polymer, or a mixture of these,
C) from 0 to 70% by weight of further additives, where the total of the percentages by weight of components A) to C) is 100%.

The invention further relates to the use of the molding compositions of the invention for producing fibers, foils, and moldings of any type, and also to the resultant moldings.

Thermoplastic polyamides, such as PA6 and PA66, are often used in the form of glassfiber-reinforced molding compositions as materials in the design of components which during their lifetime have exposure to elevated temperatures, with thermooxidative degradation. Although the thermooxidative degradation can be delayed by adding known heat stabilizers, it cannot be prevented in the long term, and becomes apparent by way of example in a reduced level of mechanical properties. It is highly desirable to improve the heat-aging resistance (HAR) of polyamides, since this can achieve longer lifetimes for components subject to thermal stress, or can reduce the risk that these fail. As an alternative, improved HAR can also permit the use of the components at higher temperatures.

WO 2006/074912 and WO 2005/007727 disclose the use of elemental iron powder in polyamides.

EP-A 1 846 506 discloses a combination of Cu-containing stabilizers with iron oxides for polyamides.

The heat-aging resistance of the known molding compositions remains unsatisfactory, in particular over prolonged periods of exposure to heat.

Highly branched melamine polymers and, respectively, melamine-urea polymers are produced by way of example by the processes of WO 2000/17171, WO 2009/080787, WO 2009/27186, WO 2008/148766, and EP-A 240 867.

These are usually used as adhesion promoters, thixotropy additives, rheology additives, or surface modifiers, and as components for producing varnishes, coatings, adhesives, sealing compositions, casting elastomers, or foams.

It was therefore an object of the present invention to provide thermoplastic polyamide molding compositions which have improved HAR, and which, after heat-aging, have a good surface, and also good mechanical properties.

Accordingly, the molding compositions defined in the introduction have been found. The dependent claims give preferred embodiments.

The molding compositions of the invention comprise, as component A), from 10 to 98% by weight, preferably from 20 to 94.9% by weight, and in particular from 25 to 89% by weight, of at least one polyamide.

The polyamides of the molding compositions of the invention generally have an intrinsic viscosity of from 90 to 350 ml/g, preferably from 110 to 240 ml/g, determined in a 0.5% strength by weight solution in 96% strength by weight sulfuric acid at 25° C. to ISO 307.

Preference is given to semicrystalline or amorphous resins with a molecular weight (weight average) of at least 5000, described by way of example in the following U.S. Pat. Nos. 2,071,250, 2,071,251, 2,130,523, 2,130,948, 2,241,322, 2,312,966, 2,512,606, and 3,393,210.

Examples of these are polyamides that derive from lactams having from 7 to 13 ring members, e.g. polycaprolactam, polycaprylolactam, and polylaurolactam, and also polyamides obtained via reaction of dicarboxylic acids with diamines.

Dicarboxylic acids which may be used are alkanedicarboxylic acids having from 6 to 12, in particular from 6 to 10, carbon atoms, and aromatic dicarboxylic acids. Merely as examples, those that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine (e.g. Ultramid® X17 from BASF SE, where the molar ratio of MXDA to adipic acid is 1:1), di(4-aminophenyl)methane, di(4-aminocyclohexyl)methane, 2,2-di(4-aminophenyl)propane, 2,2-di(4-aminocyclohexyl)propane, and 1,5-diamino-2-methylpentane.

Preferred polyamides are polyhexamethyleneadipamide, polyhexamethylenesebacamide, and polycaprolactam, and also nylon-6/6,6 copolyamides, in particular having a proportion of from 5 to 95% by weight of caprolactam units (e.g. Ultramid® C31 from BASF SE).

Other suitable polyamides are obtainable from ω-aminoalkylnitriles, e.g. aminocapronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio. Particular preference is given to mixtures of nylon-6,6 with other polyamides, in particular nylon-6/6,6 copolyamides.

Other copolyamides which have proven particularly advantageous are semiaromatic copolyamides, such as PA 6/6T and PA 66/6T, where the triamine content of these is less than 0.5% by weight, preferably less than 0.3% by weight (see EP-A 299 444). Other polyamides resistant to high temperatures are known from EP-A 19 94 075 (PA 6T/6I/MXD6).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers comprised:

AB Polymers:
PA 4 Pyrrolidone
PA 6 ε-Caprolactam
PA 7 Ethanolactam
PA 8 Caprylolactam
PA 9 9-Aminopelargonic acid
PA 11 11-Aminoundecanoic acid
PA 12 Laurolactam AA/BB Polymers:
PA 46 Tetramethylenediamine, adipic acid
PA 66 Hexamethylenediamine, adipic acid
PA 69 Hexamethylenediamine, azelaic acid
PA 610 Hexamethylenediamine, sebacic acid
PA 612 Hexamethylenediamine, decanedicarboxylic acid
PA 613 Hexamethylenediamine, undecanedicarboxylic acid
PA 1212 1,12-Dodecanediamine, decanedicarboxylic acid
PA 1313 1,13-Diaminotridecane, undecanedicarboxylic acid
PA 6T Hexamethylenediamine, terephthalic acid
PA MXD6 m-Xylylenediamine, adipic acid
AA/BB Polymers:
PA 6I Hexamethylenediamine, isophthalic acid
PA 6-3-T Trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 Diaminodicyclohexylmethane, laurolactam
PA 6I/6T/PACM as PA 6I/6T+diaminodicyclohexylmethane
PA 12/MACMI Laurolactam, dimethyldiaminodicyclohexylmethane, isophthalic acid
PA 12/MACMT Laurolactam, dimethyldiaminodicyclohexylmethane, terephthalic acid
PA PDA-T Phenylenediamine, terephthalic acid The molding compositions of the invention comprise, as component B), from 0.01 to 20% by weight, preferably from 0.1 to 5% by weight, and in particular from 0.1 to 2% by weight, of a highly branched melamine polymer or melamine-urea polymer, or a mixture of these.

For the purposes of the present invention, highly branched polymers B) are macromolecules which have both structural and molecular nonuniformity. As a function of the conduct of the reaction, they can firstly have a structure based on a central molecule by analogy with dendrimers, but with non-uniform chain length of the branches. Secondly, they can also be based on linear molecules and have a structure that uses branched functional pendent groups. For the purposes of the present invention, "highly branched" also means that the degree of branching (DB) is from 10 to 99.9%, preferably from 20 to 99%, and in particular from 20 to 95%. The degree of branching is the average number of dendritic linkages plus the average number of end groups per molecule, divided by the total of the average number of dendritic linkages, the average number of linear linkages, and the average number of end groups, multiplied by 100. "Dendritic" in this context means that the degree of branching at this site within the molecule is from 99.9 to 100%. Reference is also made to H. Frey et al., Acta. Polym. 1997, 48, 30 for the definition of the degree of branching.

"In essence not crosslinked" or "uncrosslinked" means, within the meaning of the present invention, that the degree of branching of component B) is less than 15% by weight, preferably less than 10% by weight, where the degree of branching is determined by way of the insoluble content of the polymer.

The insoluble content of the polymer B) is by way of example determined via extraction for 4 hours in a Soxhlet apparatus using a solvent identical with that used for the gel permeation chromatography (GPC) process, i.e. preferably dimethylacetamide or hexafluoroisopropanol, depending on which of the solvents is a better solvent for the polymer B), and weighing the residue after it has been dried to constant weight.

The number-average molar mass $M_n$ of the polymers B) of the invention is preferably from 1000 to 40 000 g/mol, particularly preferably from 1500 to 30 000 g/mol, and in particular from 2000 to 20 000 g/mol. The weight-average molecular weight $M_w$ is preferably from 1500 to 150 000, particularly preferably at most 100 000, more preferably at most 60 000, and in particular at most 40 000. Polydispersity (PD=quotient calculated from $M_w$ and $M_n$) is preferably at least 1.1, particularly preferably at least 1.5, and in particular at least 2.

The molecular weight and molar mass data ($M_n$, $M_w$) and polydispersity data provided for the purposes of the present invention are based on values obtained using gel permeation chromatography (GPC) in hexafluoroisopropanol as solvent, with PMMA calibration.

The amine number of component B) is preferably from 100 to 900 mg KOH/g, in particular from 200 to 800 mg KOH/g, and very particularly from 300 to 700 mg KOH/g (DIN 53176).

Component B) of the invention is obtainable by the processes of WO 2009/080787, via reaction of
(i) urea and/or at least one urea derivative;
(ii) melamine; and
(iii) at least one amine, where the at least one amine comprises
  (iii.1) from 20 to 100 mol %, based on the total amount of components (iii.1), (iii.2), and (iii.3), of at least one diamine or polyamine having two primary amino groups,
  (iii.2) from 0 to 50 mol %, based on the total amount of components (iii.1), (iii.2), and (iii.3), of at least one polyamine having at least three primary amino groups; and
  (iii.3) from 0 to 80 mol %, based on the total amount of components (iii.1), (iii.2), and (iii.3), of at least one amine having a primary amino group; and
(iv) optionally at least one melamine derivative, selected from benzoguanamine, substituted melamines, and melamine condensates.

If melamine polymers are used as component B), these can equally be produced with optional omission of component (i), the starting materials therefore being identical except that component (i) is absent.

Unless otherwise stated, the following general definitions apply for the purposes of the present invention:

$C_1$-$C_4$-Alkyl is a linear or branched alkyl radical having from 1 to 4 carbon atoms. These are methyl, ethyl, n-propyl, isopropyl, n-butyl, sec-butyl, isobutyl, and tert-butyl.

Linear $C_1$-$C_4$-alkyl is a linear alkyl radical having from 1 to 4 carbon atoms. These are methyl, ethyl, n-propyl, and n-butyl.

$C_1$-$C_{12}$-Alkyl is a linear or branched alkyl radical having from 1 to 12 carbon atoms. Examples of these are methyl, ethyl, n-propyl, isopropyl, n-butyl, sec-butyl, isobutyl, tert-butyl, pentyl, neopentyl, hexyl, heptyl, octyl, 2-ethylhexyl, nonyl, decyl, 2-propylheptyl, 4-methyl-2-propylhexyl, undecyl, dodecyl, and structural isomers of these.

Aryl is a carbocyclic aromatic radical having from 6 to 14 carbon atoms, e.g. phenyl, naphthyl, anthracenyl, or phenanthrenyl. Aryl is preferably phenyl or naphthyl, and in particular phenyl.

Aryl-$C_1$-$C_4$-alkyl is $C_1$-$C_4$-alkyl as defined above, but where a hydrogen atom has been replaced by an aryl group. Examples are benzyl, phenethyl, and the like.

$C_1$-$C_4$-Alkylene is a linear or branched divalent alkyl radical having 1, 2, 3, or 4 carbon atoms. Examples are —$CH_2$—, —$CH_2CH_2$—, —$CH(CH_3)$—, —$CH_2CH_2CH_2$—, —$CH(CH_3)CH_2$—, —$CH_2CH(CH_3)$—, —$C(CH_3)_2$—, —CH$_2$CH$_2$CH$_2$CH$_2$—, —CH(CH$_3$)CH$_2$CH$_2$—, —CH$_2$CH$_2$CH(CH$_3$)—, —C(CH$_3$)$_2$CH$_2$—, —CH$_2$C(CH$_3$)$_2$—, and —CH$_2$CH$_2$CH$_2$CH$_2$—.

Linear or branched C$_2$-C$_5$-alkylene is a linear or branched divalent alkyl radical having 2, 3, 4, or 5 carbon atoms. Examples are —CH$_2$CH$_2$—, —CH(CH$_3$)—, —CH$_2$CH$_2$CH$_2$—, —CH(CH$_3$)CH$_2$—, —CH$_2$CH(CH$_3$)—, —C(CH$_3$)$_2$—, —CH$_2$CH$_2$CH$_2$CH$_2$—, —CH(CH$_3$)CH$_2$CH$_2$—, —CH$_2$CH$_2$CH(CH$_3$)—, —C(CH$_3$)$_2$CH$_2$—, —CH$_2$C(CH$_3$)$_2$—, and —CH$_2$CH$_2$CH$_2$CH$_2$CH$_2$—.

Linear or branched C$_4$-C$_8$-alkylene is a linear or branched divalent alkyl radical having from 4 to 8 carbon atoms. Examples are —CH$_2$CH$_2$CH$_2$CH$_2$—, —CH(CH$_3$)CH$_2$CH$_2$—, —CH$_2$CH$_2$CH(CH$_3$)—, —C(CH$_3$)$_2$CH$_2$—, —CH$_2$C(CH$_3$)$_2$—, —CH$_2$CH$_2$CH$_2$CH$_2$CH$_2$—, —CH$_2$C(CH$_3$)$_2$CH$_2$—, —CH$_2$CH$_2$CH$_2$CH$_2$CH$_2$CH$_2$—, —(CH$_2$)$_7$—, —(CH$_2$)$_8$—, and positional isomers thereof.

Linear or branched C$_2$-C$_{10}$-alkylene is a linear or branched divalent alkyl radical having from 2 to 10 carbon atoms. Examples, alongside the abovementioned C$_2$-C$_5$-alkylene radicals, are the higher homologs having from 6 to 10 carbon atoms, e.g. hexylene, heptylene, octylene, nonylene, and decylene.

Linear or branched C$_2$-C$_{20}$-alkylene is a linear or branched divalent alkyl radical having from 2 to 20 carbon atoms. Examples, alongside the abovementioned C$_2$-C$_5$-alkylene radicals, are the higher homologs having from 6 to 20 carbon atoms, e.g. hexylene, heptylene, octylene, nonylene, decylene, undecylene, dodecylene, tridecylene, tetradecylene, pentadecylene, hexadecylene, heptadecylene, octadecylene, nonadecylene, and eicosylene.

Alkenylene is a linear or branched aliphatic mono- or polyolefinically unsaturated, e.g. mono- or diolefinically unsaturated, divalent radical having by way of example from 2 to 20, or from 2 to 10, or from 4 to 8, carbon atoms. If the radical comprises more than one carbon-carbon double bond, these are preferably not vicinal, i.e. not allenic.

Alkynylene is a linear or branched aliphatic divalent radical having by way of example from 2 to 20, or from 2 to 10, or from 4 to 8, carbon atoms, and comprising one or more, e.g. 1 or 2, carbon-carbon triple bonds.

C$_5$-C$_8$-Cycloalkylene is a divalent monocyclic, saturated hydrocarbon group having from 5 to 8 carbon ring members. Examples are cyclopentane-1,2-diyl, cyclopentane-1,3-diyl, cyclohexane-1,2-diyl, cyclohexane-1,3-diyl, cyclohexane-1,4-diyl, cycloheptane-1,2-diyl, cycloheptane-1,3-diyl, cycloheptane-1,4-diyl, cyclooctane-1,2-diyl, cyclooctane-1,3-diyl, cyclooctane-1,4-diyl, and cyclooctane-1,5-diyl.

A 5- or 6-membered unsaturated nonaromatic heterocycle which has bonding by way of N and which can also comprise one or two further nitrogen atoms, or one further sulfur atom or oxygen atom, as ring member, is by way of example pyrrolin-1-yl, pyrazolin-1-yl, imidazolin-1-yl, 2,3-dihydrooxazol-3-yl, 2,3-, and 2,5-dihydroisoxazol-2-yl, 2,3-dihydrothiazol-3-yl, 2,3-, and 2,5-dihydroisothiazol-2-yl, [1,2,3]-1H-triazolin-1-yl, [1,2,4]-1H-triazolin-1-yl, [1,3,4]-1H-triazolin-1-yl, [1,2,3]-2H-triazolin-2-yl, 1,2-dihydropyridin-1-yl, 1,4-dihydropyridin-1-yl, 1,2,3,4-tetrahydropyridin-1-yl, 1,2-dihydropyridazin-1-yl, 1,4-dihydropyridazin-1-yl, 1,6-dihydropyridazin-1-yl, 1,2,3,4-tetrahydropyridazin-1-yl, 1,4,5,6-tetrahydropyridazin-1-yl, 1,2-dihydropyrimidin-1-yl, 1,4-dihydropyrimidin-1-yl, 1,6-dihydropyrimidin-1-yl, 1,2,3,4-tetrahydropyrimidin-1-yl, 1,4,5,6-tetrahydropyrimidin-1-yl, 1,2-dihydropyrazin-1-yl, 1,4-dihydropyrazin-1-yl, 1,2,3,4-tetrahydropyrazin-1-yl,1,4-oxazin-4-yl, 2,3-dihydro-1,4-oxazin-4-yl, 2,3,5,6-tetrahydro-1,4-oxazin-4-yl, 1,4-thiazin-4-yl, 2,3-dihydro-1,4-thiazin-4-yl, 2,3,5,6-tetrahydro-1,4-thiazin-4-yl, 1,2-dihydro-1,3,5-triazin-1-yl, 1,2,3,4-tetrahydro-1,3,5-triazin-1-yl, and the like.

A 5- or 6-membered unsaturated aromatic heterocycle which has bonding by way of N and which can also comprise a further nitrogen atom, as ring member, is by way of example pyrrol-1-yl, pyrazol-1-yl, imidazol-1-yl, and triazol-1-yl.

A primary amino group is an —NH$_2$ radical.

The statements made below relating to preferred embodiments of the process of the invention, in particular relating to the monomers and further reaction components used in the invention, and to the polymers obtainable by the process, and also to the use of these, apply either in isolation or in particular in any conceivable combination.

Urea and/or a urea derivative is usually used as component (i).

It is preferable that the urea derivatives have been selected from substituted ureas of the formula R$^1$R$^2$N—C(=O)—NR$^3$R$^4$, in which R$^1$, R$^2$, R$^3$ and R$^4$, independently of one another, have been selected from hydrogen, C$_1$-C$_{12}$-alkyl, aryl, and aryl-C$_1$-C$_4$-alkyl, or R$^1$ and R$^2$ and/or R$^3$ and R$^4$ respectively together are C$_2$-C$_5$-alkylene, where a methylene group (i.e. a CH$_2$ group in the alkylene chain) can optionally have been replaced by a carbonyl group, or R$^1$ and R$^3$ together are C$_2$-C$_5$-alkylene, where a methylene group (i.e. a CH$_2$ group in the alkylene chain) can optionally have been replaced by a carbonyl group, or R$^1$ and R$^2$, and/or R$^3$ and R$^4$, respectively together with the nitrogen atom bonded thereto, form a 5- or 6-membered unsaturated aromatic or nonaromatic ring, which can comprise one or two further nitrogen atoms, or a sulfur atom or oxygen atom, as ring member (i.e. R$^1$ and R$^2$ and, respectively, R$^3$ and R$^4$, together with the nitrogen atom bonded thereto, are a 5- or 6-membered unsaturated aromatic or nonaromatic ring which has bonding by way of N and which can comprise one or two further nitrogen atoms, or a sulfur atom or oxygen atom, as ring member);

where at least one of the radicals R$^1$, R$^2$, R$^3$, and R$^4$ is not hydrogen;

thiourea;

substituted thioureas of the formula R$^5$R$^6$N—C(=S)—NR$^7$R$^8$, in which R$^5$, R$^6$, R$^7$, and R$^8$, independently of one another, have been selected from hydrogen, C$_1$-C$_{12}$-alkyl, aryl, and aryl-C$_1$-C$_4$-alkyl, or R$^5$ and R$^6$ and/or R$^7$ and R$^8$ respectively together are C$_2$-C$_5$-alkylene, where a methylene group (i.e. a CH$_2$ group in the alkylene chain) can optionally have been replaced by a carbonyl group, or R$^5$ and R$^7$ together are C$_2$-C$_5$-alkylene, where a methylene group (i.e. a CH$_2$ group in the alkylene chain) can optionally have been replaced by a carbonyl group, or R$^5$ and R$^6$, and/or R$^7$ and R$^8$, respectively together with the nitrogen atom bonded thereto, form a 5- or 6-membered unsaturated aromatic or nonaromatic ring, which can comprise one or two further nitrogen atoms, or a sulfur atom or oxygen atom, as ring member (i.e. R$^5$ and R$^6$ and, respectively, R$^7$ and R$^8$, together with the nitrogen atom bonded thereto, are a 5- or 6-membered unsaturated aromatic or nonaromatic ring which has bonding by way of N and which can comprise one or two further nitrogen atoms, or a sulfur atom or oxygen atom, as ring member);

where at least one of the radicals $R^5$, $R^6$, $R^7$, and $R^8$ is not hydrogen;

guanidine;

substituted guanidines of the formula $R^9R^{10}N$—C(=$NR^{11}$)—$NR^{12}R^{13}$, in which $R^9$, $R^{10}$, $R^{11}$, $R^{12}$, and $R^{13}$, independently of one another, have been selected from hydrogen, $C_1$-$C_{12}$-alkyl, aryl, and aryl-$C_1$-$C_4$-alkyl, or $R^9$ and $R^{10}$ and/or $R^{12}$ and $R^{13}$ respectively together are $C_2$-$C_5$-alkylene, where a methylene group (i.e. a $CH_2$ group in the alkylene chain) can optionally have been replaced by a carbonyl group, or $R^9$ and $R^{12}$ together are $C_2$-$C_5$-alkylene, where a methylene group (i.e. a $CH_2$ group in the alkylene chain) can optionally have been replaced by a carbonyl group, or $R^9$ and $R^{10}$, and/or $R^{12}$ and $R^{13}$, respectively together with the nitrogen atom bonded thereto, form a 5- or 6-membered unsaturated aromatic or nonaromatic ring, which can also comprise a further nitrogen atom, sulfur atom or oxygen atom, as ring member (i.e. $R^9$ and $R^{10}$ and, respectively, $R^{12}$ and $R^{13}$, together with the nitrogen atom bonded thereto, are a 5- or 6-membered unsaturated aromatic or nonaromatic ring which has bonding by way of N and which can comprise one or two further nitrogen atoms, or a sulfur atom or oxygen atom, as ring member);

where at least one of the radicals $R^9$, $R^{10}$, $R^{11}$, $R^{12}$, and $R^{13}$ is not hydrogen; and carbonic esters of the formula $R^{14}$—O—CO—O—$R^{15}$, in which $R^{14}$ and $R^{15}$, independently of one another, have been selected from $C_1$-$C_{12}$-alkyl, aryl, and aryl-$C_1$-$C_4$-alkyl, or $R^{14}$ and $R^{15}$ together are $C_2$-$C_5$-alkylene.

It is, of course, also possible to use mixtures of various urea derivatives.

In a preferred embodiment, $R^2$ and $R^4$ in the substituted ureas are hydrogen, and $R^1$ and $R^3$ are identical or different and are $C_1$-$C_{12}$-alkyl, aryl, or aryl-$C_1$-$C_4$-alkyl. Examples here are N,N'-dimethylurea, N,N'-diethylurea, N,N'-dipropylurea, N,N'-diisopropylurea, N,N'-di-n-butylurea, N,N'-diisobutylurea, N,N'-di-sec-butylurea, N,N'-di-tert-butylurea, N,N'-dipentylurea, N,N'-dihexylurea, N,N'-diheptylurea, N,N'-dioctylurea, N,N'-didecylurea, N,N'-didodecylurea, N,N'-diphenylurea, N,N'-dinaphthylurea, N,N'-ditolylurea, N,N'-dibenzylurea, N-methyl-N'-phenylurea, and N-ethyl-N'-phenylurea.

In an alternatively preferred embodiment, $R^1$, $R^2$, $R^3$, and $R^4$ are identical and are linear $C_1$-$C_4$-alkyl. Examples here are N,N,N',N'-tetramethylurea and N,N,N',N'-tetraethylurea.

In an alternatively preferred embodiment, $R^1$ and $R^2$, and also $R^3$ and $R^4$, are respectively together $C_2$-$C_5$-alkylene; that means that $R^1$ and $R^2$ together form a $C_2$-$C_5$-alkylene group and that $R^3$ and $R^4$ together form a $C_2$-$C_5$-alkylene group. Examples here are di(tetrahydro-1H-pyrrol-1-yl)methanone, bis(pentamethylene)urea, and carbonylbiscaprolactam.

In an alternatively preferred embodiment, $R^2$ and $R^4$ are hydrogen, and $R^1$ and $R^3$ together form a $C_2$-$C_5$-alkylene group, where a methylene group can optionally have been replaced by a carbonyl group. Examples here are ethyleneurea, and also 1,2- or 1,3-propyleneurea.

In an alternatively preferred embodiment, $R^1$ and $R^2$, and also $R^3$ and $R^4$, respectively form, together with the nitrogen atom bonded thereto, an unsaturated aromatic or nonaromatic heterocycle as defined above. Examples here are carbonyldipyrazole and carbonyldiimidazole.

In a preferred embodiment, $R^6$ and $R^8$ in the substituted thioureas are hydrogen, and $R^5$ and $R^7$ are identical or different and are $C_1$-$C_{12}$-alkyl, aryl, or aryl-$C_1$-$C_4$-alkyl. Examples here are N,N'-dimethylthiourea, N,N'-diethylthiourea, N,N'-dipropylthiourea, N,N'-diisopropylthiourea, N,N'-di-n-butylthiourea, N,N'-diisobutylthiourea, N,N'-di-sec-butylthiourea, N,N'-di-tert-butylthiourea, N,N'-dipentylthiourea, N,N'-dihexylthiourea, N,N'-diheptylthiourea, N,N'-dioctylthiourea, N,N'-didecylthiourea, N,N'-didodecylthiourea, N,N'-diphenylthiourea, N,N'-dinaphthylthiourea, N,N'-ditolylthiourea, N,N'-dibenzylthiourea, N-methyl-N'-phenylthiourea, and N-ethyl-N'-phenylthiourea.

In an alternatively preferred embodiment, $R^5$, $R^6$, $R^7$, and $R^8$ are identical and are linear $C_1$-$C_4$-alkyl. Examples here are N,N,N',N'-tetramethylthiourea and N,N,N',N'-tetraethylthiourea.

In an alternatively preferred embodiment, $R^5$ and $R^6$, and also $R^7$ and $R^8$, respectively are together $C_2$-$C_5$-alkylene; that means that $R^5$ and $R^6$ together form a $C_2$-$C_5$-alkylene group, and that $R^7$ and $R^8$ together form a $C_2$-$C_5$-alkylene group. Examples here are di(tetrahydro-1H-pyrrol-1-yl)methanethione, bis(pentamethylene)thiourea, and thiocarbonylbiscaprolactam.

In an alternatively preferred embodiment, $R^6$ and $R^8$ are hydrogen, and $R^5$ and $R^7$ together form a $C_2$-$C_5$-alkylene group, where a methylene group can optionally have been replaced by a thiocarbonyl group. Examples here are ethylenethiourea, and also 1,2- or 1,3-propylenethiourea.

In an alternatively preferred embodiment, $R^5$ and $R^6$, and also $R^7$ and $R^8$, respectively form, together with the nitrogen atom bonded thereto, an unsaturated aromatic or nonaromatic heterocycle as defined above. Examples here are thiocarbonyldipyrazole and thiocarbonyldiimidazole.

In a preferred embodiment, $R^{10}$ and $R^{13}$ in the substituted guanidines are hydrogen, and $R^9$ and $R^{12}$ are identical or different and are $C_1$-$C_{12}$-alkyl, aryl, or aryl-$C_1$-$C_4$-alkyl. Examples here are N,N'-dimethylguanidine, N,N'-diethylguanidine, N,N'-dipropylguanidine, N,N'-diisopropylguanidine, N,N'-di-n-butylguanidine, N,N'-diisobutylguanidine, N,N'-di-sec-butylguanidine, N,N'-di-tert-butylguanidine, N,N'-dipentylguanidine, N,N'-dihexylguanidine, N,N'-diheptylguanidine, N,N'-dioctylguanidine, N,N'-didecylguanidine, N,N'-didodecylguanidine, N,N'-diphenylguanidine, N,N'-dinaphthylguanidine, N,N'-ditolylguanidine, N,N'-dibenzylguanidine, N-methyl-N'-phenylguanidine, and N-ethyl-N'-phenylguanidine.

In an alternatively preferred embodiment, $R^9$, $R^{10}$, $R^{12}$, and $R^{13}$ are identical and are linear $C_1$-$C_4$-alkyl. Examples here are N,N,N',N'-tetramethylguanidine and N,N,N',N'-tetraethylguanidine.

In an alternatively preferred embodiment, $R^9$ and $R^{10}$, and also $R^{12}$ and $R^{13}$, are respectively together $C_2$-$C_5$-alkylene; that means that $R^9$ and $R^{10}$ together form a $C_2$-$C_5$-alkylene group and that $R^{12}$ and $R^{13}$ together form a $C_2$-$C_5$-alkylene group. Examples here are di(tetrahydro-1H-pyrrol-1-yl)imine, bis(pentamethylene)guanidine, and iminobiscaprolactam.

In an alternatively preferred embodiment, $R^{10}$ and $R^{13}$ are hydrogen, and $R^9$ and $R^{12}$ together form a $C_2$-$C_5$-alkylene group, where a methylene group, can optionally have been replaced by a carbonyl group. Examples here are ethyleneguanidine, and also 1,2- or 1,3-propyleneguanidine.

In an alternatively preferred embodiment, $R^9$ and $R^{10}$, and also $R^{12}$ and $R^{13}$, respectively form, together with the nitrogen atom bonded thereto, an unsaturated aromatic or nonaromatic heterocycle as defined above. Examples here are iminodipyrazole and iminodiimidazole.

In a preferred embodiment, $R^{14}$ and $R^{15}$ are $C_1$-$C_4$-alkyl. It is particularly preferable that the two radicals are identical. Examples here are dimethyl carbonate, diethyl carbonate, dipropyl carbonate, diisopropyl carbonate, di-n-butyl carbonate, di-sec-butyl carbonate, diisobutyl carbonate, and di-tert-butyl carbonate. Among these, preference is given to dimethyl carbonate and diethyl carbonate.

In an alternatively preferred embodiment, $R^{14}$ and $R^{15}$ together are $C_2$-$C_5$-alkylene, and preferably $C_2$-$C_3$-alkylene. Examples of these carbonates are ethylene carbonate, and also 1,2- and 1,3-propylene carbonate.

Among the abovementioned urea derivatives, preference is given to the substituted ureas, thiourea, the substituted thioureas, and the carbonic esters. More preference is given to the substituted ureas, thiourea, and the carbonic esters. Among these, preference is given to thiourea, N,N'-dimethylurea, N,N'-diethylurea, N,N'-di-n-butylurea, N,N'-diisobutylurea, N,N,N',N'-tetramethylurea, dimethyl carbonate, diethyl carbonate, ethylene carbonate, and 1,2-propylene carbonate.

However, it is preferable to use urea itself as component (i), optionally in combination with one of the abovementioned urea derivatives, and it is particularly preferable to use only urea.

Component (i) is not used as starting material for producing the melamine polymers.

The at least one amine (iii) is preferably composed exclusively of components (iii.1), (iii.2), and (iii.3); that means that the proportions of said three components give a total of 100 mol % of component (iii).

The amount used of component (iii.1) is preferably from 30 to 100 mol %, particularly preferably from 50 to 100 mol %, and in particular from 75 to 100 mol %, based on the total amount of components (iii.1), (iii.2), and (iii.3).

The amount used of component (iii.2) is preferably from 0 to 40 mol %, particularly preferably from 0 to 30 mol %, and in particular from 0 to 15 mol %, based on the total amount of components (iii.1), (iii.2), and (iii.3).

The amount used of component (iii.3) is preferably from 0 to 70 mol %, particularly preferably from 0 to 50 mol %, and in particular from 0 to 25 mol %, based on the total amount of components (iii.1), (iii.2), and (iii.3).

If component (iii.2) is used, the amount used thereof is preferably from 1 to 50 mol %, e.g. from 5 to 50 mol % or from 10 to 50 mol %, particularly preferably from 1 to 40 mol %, e.g. from 5 to 40 mol % or from 10 to 40 mol %, more preferably from 1 to 30 mol %, e.g. from 5 to 30 mol % or from 10 to 30 mol %, and in particular from 1 to 15 mol %, e.g. from 2 to 15 mol % or from 5 to 15 mol %, based on the total amount of components (iii.1), (iii.2), and (iii.3).

If component (iii.3) is used, the amount used thereof is preferably from 1 to 80 mol %, e.g. from 5 to 80 mol % or from 10 to 80 mol %, particularly preferably from 1 to 70 mol %, e.g. from 5 to 70 mol % or from 10 to 70 mol %, more preferably from 1 to 50 mol %, e.g. from 5 to 50 mol % or from 10 to 50 mol %, and in particular from 1 to 25 mol %, e.g. from 5 to 25 mol % or from 10 to 25 mol %, based on the total amount of components (iii.1), (iii.2), and (iii.3).

Component (iii.1) comprises exactly two primary amino groups (—$NH_2$).

If component (iii.1) is a polyamine, this comprises two primary amino groups (—$NH_2$) and, in addition, one or more secondary amino groups (—NHR; R not equal to H), and/or tertiary amino groups (—NRR'; R and R' not equal to H), e.g. from 1 to 20, or from 1 to 10, or from 1 to 4, secondary and/or tertiary amino groups.

If component (iii.1) is a diamine, this comprises no further amino functions other than the two primary amino groups.

The di- or polyamine of component (iii.1) has preferably been selected from amines of the formula

in which

A is a divalent aliphatic, alicyclic, aliphatic-alicyclic, aromatic, or araliphatic radical, where the abovementioned radicals can also have interruption by a carbonyl group or by a sulfone group, and/or can have substitution by 1, 2, 3, or 4 radicals selected from $C_1$-$C_4$-alkyl; or is a divalent radical of the formula

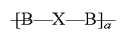

in which

X is O or $NR^a$, in which $R^a$ is H, $C_1$-$C_4$-alkyl, $C_2$-$C_4$-hydroxyalkyl, or $C_1$-$C_4$-alkoxy;

B is $C_2$-$C_6$-alkylene; and a is a number from 1 to 20.

Mixtures of said amines are also suitable.

Divalent aliphatic radicals are those which do not comprise any cycloaliphatic, aromatic, or heterocyclic constituents. Examples are alkylene, alkenylene, and alkynylene radicals.

Divalent alicyclic radicals can comprise one or more, e.g. one or two, alicyclic radicals; however, they do not comprise any aromatic or heterocyclic constituents. The alicyclic radicals can have substitution by aliphatic radicals, but the location of both of the bonding sites for the $NH_2$ groups is at the alicyclic radical.

Divalent aliphatic-alicyclic radicals comprise not only at least one divalent aliphatic radical but also at least one divalent alicyclic radical, where the location of the two bonding sites for the $NH_2$ groups can be as follows: either both at the alicyclic radical(s) or both at the aliphatic radical(s), or one at an aliphatic radical and the other at an alicyclic radical.

Divalent aromatic radicals can comprise one or more, e.g. one or two, aromatic radicals; however, they comprise no alicyclic or heterocyclic constituents. The aromatic radicals can have substitution by aliphatic radicals, but the location of both of the bonding sites for the $NH_2$ groups is at the aromatic radical.

Divalent araliphatic radicals comprise not only at least one divalent aliphatic radical but also at least one divalent aromatic radical, where the location of the two bonding sites for the $NH_2$ groups can be as follows: either both at the aromatic radical(s) or both at the aliphatic radical(s), or one at an aliphatic radical and the other at an aromatic radical.

In a preferred embodiment, the divalent aliphatic radical A is linear or branched $C_2$-$C_{20}$-alkylene, particularly preferably linear or branched $C_2$-$C_{10}$-alkylene, and in particular linear or branched $C_4$-$C_8$-alkylene.

Examples of suitable amines in which the radical A is defined in this way ($C_2$-$C_{20}$-alkylene) are 1,2-ethylenediamine, 1,2- and 1,3-propylenediamine, 2,2-dimethyl-1,3-propanediamine, 1,4-butylenediamine, 1,5-pentylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylene-diamine, octadecamethylenediamine, nonadecamethylenediamine, eicosamethylene-diamine, 2-butyl-2-ethyl-1,5-pentamethylenediamine, 2,2,4- or 2,4,4-trimethyl-1,6-hexamethylenediamine, 1,5-diamino-2-methylpentane, 1,4-diamino-4-methylpentane, and the like.

Among these, preference is given to amines in which A is linear or branched $C_2$-$C_{10}$-alkylene, as in 1,2-ethylenediamine, 1,2- and 1,3-propylenediamine, 2,2-dimethyl-1,3-propanediamine, 1,4-butylenediamine, 1,5-pentylenediamine, hexamethylenediamine, heptamethylenediamine, octamethylenediamine, nonamethylenediamine, decamethylenediamine, 2,2,4- or 2,4,4-trimethyl-1,6-hexamethylenediamine, 1,5-diamino-2-methylpentane, 1,4-diamino-4-methylpentane, and the like.

Among these, particular preference is given to amines in which A is linear or branched $C_4$-$C_8$-alkylene, as in 2,2-dimethyl-1,3-propanediamine, 1,4-butylenediamine, 1,5-pentylenediamine, hexamethylenediamine, heptamethylenediamine, octamethylenediamine, 1,5-diamino-2-methylpentane, 1,4-diamino-4-methylpentane, and the like. In a specific embodiment, amines are used in which A is linear or branched $C_4$-$C_8$-alkylene, where at most one branching system starts from any carbon atom in the branched alkylene. Examples of these amines are 1,4-butylenediamine, 1,5-pentylenediamine, hexamethylenediamine, heptamethylenediamine, octamethylenediamine, and 1,5-diamino-2-methylpentane, i.e. the amines listed above as particularly preferred except for 2,2-dimethyl-1,3-propanediamine and 1,4-diamino-4-methylpentane. Still more specifically, amines are used in which A is linear $C_4$-$C_8$-alkylene, e.g. 1,4-butylenediamine, 1,5-pentylenediamine, hexamethylenediamine, heptamethylenediamine, and octamethylenediamine.

In a preferred embodiment, the divalent alicyclic radicals A have been selected from $C_5$-$C_8$-cycloalkylene which can bear 1, 2, 3, or 4 $C_1$-$C_4$-alkyl radicals.

Examples of suitable amines in which the radical A has this definition are cyclopentylenediamine, such as 1,2-diaminocyclopentane or 1,3-diaminocyclopentane, cyclohexylenediamine, such as 1,2-diaminocyclohexane, 1,3-diaminocyclohexane, or 1,4-diaminocyclohexane, 1-methyl-2,4-diaminocyclohexane, 1-methyl-2,6-diaminocyclohexane, cycloheptylenediamine, such as 1,2-diaminocycloheptane, 1,3-diaminocycloheptane or 1,4-diaminocycloheptane, and cyclooctylenediamine, such as 1,2-diaminocyclooctane, 1,3-diaminocyclooctane, 1,4-diaminocyclooctane or 1,5-diaminocyclooctane. The amino groups can have cis- or trans-position with respect to one another.

In a preferred embodiment, the divalent aliphatic-alicyclic radicals A have been selected from $C_5$-$C_8$-cycloalkylene-$C_1$-$C_4$-alkylene, $C_5$-$C_8$-cycloalkylene-$C_1$-$C_4$-alkylene-$C_5$-$C_8$-cycloalkylene, and $C_1$-$C_4$-alkylene-$C_5$-$C_8$-cycloalkylene-$C_1$-$C_4$-alkylene, where the cycloalkylene radicals can bear 1, 2, 3, or 4 $C_1$-$C_4$-alkyl radicals.

Examples of suitable amines in which the radical A has this definition are diaminodicyclohexylmethane, isophoronediamine, bis(aminomethyl)cyclohexane, such as 1,1-bis(aminomethyl)cyclohexane, 1,2-bis(aminomethyl)cyclohexane, 1,3-bis(aminomethyl)cyclohexane, or 1,4-bis(aminomethyl)cyclohexane, 2-aminopropylcyclohexylamine, 3(4)-aminomethyl-1-methylcyclohexylamine, and the like. The groups bonded at the alicyclic radical can assume any desired relative position (cis/trans) with respect to one another.

In a preferred embodiment, the divalent aromatic radicals A have been selected from phenylene, biphenylene, naphthylene, phenylene sulfone phenylene, and phenylene carbonyl phenylene, where the phenylene and naphthylene radicals can bear 1, 2, 3, or 4 $C_1$-$C_4$-alkyl radicals.

Examples of suitable amines in which the radical A has this definition are phenylenediamine, such as o-, m-, and p-phenylenediamine, tolylenediamine, such as o-, m-, and p-tolylenediamine, xylylenediamine, naphthylenediamine, examples being 1,2-, 1,3-, 1,4-, 1,5-, 1,8-, 2,3-, 2,6-, and 2,7-naphthylene, diaminodiphenyl sulfone, examples being 2,2'-, 3,3'-, and 4,4'-diaminodiphenyl sulfone, and diaminobenzophenone, examples being 2,2'-, 3,3'-, and 4,4'-diaminobenzophenone.

In a preferred embodiment, the divalent araliphatic radicals A have been selected from phenylene-$C_1$-$C_4$-alkylene and phenylene-$C_1$-$C_4$-alkylenephenylene, where the phenylene radicals can bear 1, 2, 3, or 4 $C_1$-$C_4$-alkyl radicals.

Examples of suitable amines in which the radical A has this definition are diaminodiphenylmethane, examples being 2,2'-, 3,3'-, and 4,4'-diaminodiphenylmethane, and the like.

In a preferred embodiment, X is O, and a here is preferably a number from 2 to 6.

Examples of suitable amines in which the radical A has this definition are amine-terminated polyoxyalkylene polyols, examples being Jeffamines, such as 4,9-dioxadodecane-1,12-diamine and 4,7,10-trioxamidecane-1,13-diamine, or else amine-terminated polyoxyalkylene polyols of more regular type, examples being amine-terminated polyethylene glycols, amine-terminated polypropylene glycols, or amine-terminated polybutylene glycols. The molar mass of the three last-mentioned amines (amine-terminated polyalkylene glycols) is preferably from 200 to 3000 g/mol.

In an alternatively preferred embodiment, X is $NR^a$. $R^a$ here is preferably H or $C_1$-$C_4$-alkyl, particularly preferably H or methyl, and in particular H. B here is in particular $C_2$-$C_3$-alkylene, such as 1,2-ethylene, 1,2-propylene, and 1,3-propylene, and in particular 1,2-ethylene, and a is preferably a number from 1 to 10, particularly preferably from 1 to 6, and in particular from 1 to 4.

Examples of suitable amines in which the radical A has this definition are diethylenetriamine, triethylenetetramine, tetraethylenepentamine, pentaethylenehexamine, hexaethyleneheptamine, heptaethyleneoctamine, octaethylenenonamine, higher polyimines, bis(3-aminopropyl)amine, bis(3-aminopropyl)methylamine, and the like.

It is preferable to use, as component (iii.1), at least one diamine having two primary amino groups. Accordingly, the at least one amine (iii.1) comprises no further (primary, secondary, and/or tertiary) amino groups alongside the two primary amino functions.

Preferred diamines having two primary amino groups are those of the formula $NH_2$-A-$NH_2$, in which A is a divalent aliphatic, alicyclic, aliphatic-alicyclic, aromatic, or araliphatic radical, where the abovementioned radicals can also have interruption by a carbonyl group or by a sulfone group, and/or can have substitution by 1, 2, 3, or 4 radicals selected from $C_1$-$C_4$-alkyl, and where the abovementioned radicals comprise, of course, no amino groups; or is a divalent radical of the formula

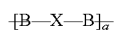

in which
X is O;
B is $C_2$-$C_6$-alkylene; and
a is a number from 1 to 100, preferably from 1 to 80, and in particular from 1 to 20.

The above statements relating to suitable and preferred aliphatic, alicyclic, aliphatic-alicyclic, aromatic, or araliphatic radicals, and to divalent radicals of the formula $\text{-}[B\text{-}X\text{-}B]_a\text{-}$, in which X is O, are hereby incorporated herein by way of reference, as also are the associated preferred and suitable amines.

Particularly preferred diamines having two primary amino groups are those of the formula $NH_2$-A-$NH_2$, in which A is a divalent aliphatic radical and is preferably linear or branched $C_2$-$C_{20}$-alkylene. Examples of suitable amines in which the radical A has this definition ($C_2$-$C_{20}$-alkylene) are 1,2-ethylenediamine, 1,2- and 1,3-propylenediamine, 2,2-dimethyl-1,3-propanediamine, 1,4-butylenediamine, 1,5-pentylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylenediamine, octadecamethylenediamine, nonadecamethylenediamine, eicosamethylenediamine, 2-butyl-2-ethyl-1,5-pentamethylenediamine, 2,2,4- or 2,4,4-trimethyl-1,6-hexamethylenediamine, 1,5-diamino-2-methylpentane, 1,4-diamino-4-methylpentane, and the like.

It is particularly preferable that A in the diamines having two primary amino groups is linear or branched $C_2$-$C_{10}$-alkylene. Examples of suitable amines in which the radical A has this definition ($C_2$-$C_{10}$-alkylene) are 1,2-ethylenediamine, 1,2- and 1,3-propylenediamine, 2,2-dimethyl-1,3-propanediamine, 1,4-butylenediamine, 1,5-pentylenediamine, hexamethylenediamine, heptamethylenediamine, octamethylenediamine, nonamethylenediamine, decamethylenediamine, 2,2,4- or 2,4,4-trimethyl-1,6-hexamethylenediamine, 1,5-diamino-2-methylpentane, 1,4-diamino-4-methylpentane, and the like.

In particular, A in the diamines having two primary amino groups is linear or branched $C_4$-$C_8$-alkylene. Examples of suitable amines in which the radical A has this definition ($C_4$-$C_8$-alkylene) are 2,2-dimethyl-1,3-propanediamine, 1,4-butylenediamine, 1,5-pentylenediamine, hexamethylenediamine, heptamethylenediamine, octamethylenediamine, 1,5-diamino-2-methylpentane, 1,4-diamino-4-methylpentane, and the like. In one specific embodiment, amines are used in which A is linear or branched $C_4$-$C_8$-alkylene, where at most one branching system starts from any carbon atom in the branched alkylene. Examples of these amines are 1,4-butylenediamine, 1,5-pentylenediamine, hexamethylenediamine, heptamethylenediamine, octamethylenediamine, and 1,5-diamino-2-methylpentane, i.e. the amines listed above as particularly preferred except for 2,2-dimethyl-1,3-propanediamine and 1,4-diamino-4-methylpentane. Among these, more preference is given to amines in which A is linear $C_4$-$C_8$-alkylene, as in 1,4-butylenediamine, 1,5-pentylenediamine, hexamethylenediamine, heptamethylenediamine, and octamethylenediamine.

The diamine having two primary amino groups is especially hexamethylenediamine.

A polyamine having at least three primary amino groups can moreover optionally be used in the process of the invention (component iii.2).

Said component (iii.2) comprises three or more primary amino groups and can moreover also comprise one or more secondary and/or tertiary amino groups.

Examples of these amines are 3-(2-aminoethyl)aminopropylamine, N,N-bis(3-aminopropyl)ethylenediamine, N,N-bis(3-aminopropyl)butanediamine, N,N,N',N'-tetra(3-aminopropyl)ethylenediamine, N,N,N',N'-tetra(3-aminopropyl)butylenediamine, tris(aminoethyl)amine, tris(aminopropyl)amine, tris(aminohexyl)amine, trisaminohexane, 4-aminomethyl-1,8-octamethylenediamine, trisaminononane, or amine-terminated polyoxyalkylene polyols of functionality three or higher (e.g. Jeffamines, for example polyetheramine T403 or polyetheramine T5000) with a molecular weight which is preferably from 300 to 10 000.

Among these, preference is given to tris(aminoethyl)amine, tris(aminopropyl)amine, and Jeffamines, for example polyetheramine T403 or polyetheramine T5000.

Said component (iii.2) is especially useful in the process of the invention when the intention is that the degree of branching set for the polymers is higher than possible with the di- or polyamine (iii.1) alone, because polyamines having at least three primary amino groups provide access to further branching possibilities, alongside the melamine (ii) that must be used. The secondary and/or tertiary amino groups comprised in the polyamine (iii.1) are less reactive than the primary amino groups and, under the reaction conditions of the process of the invention, mostly have only small capability, if any capability at all, for entering into a condensation reaction and therefore forming a branching site. In any instance they have in essence less capability than component (iii.2) for forming branching sites.

If, in contrast, the intention is to have a smaller degree of branching, it is clearly possible to use, in the process of the invention, at least one amine having a primary amino group (components iii.3).

This component is an amine having a single primary amino function and optionally having one or more secondary and/or tertiary amino groups.

Examples of primary amines having no further secondary/tertiary amino functions (primary monoamines) are compounds of the formula R—$NH_2$, in which R is an aliphatic, alicyclic, aliphatic-alicyclic, aromatic, or araliphatic radical, which, of course, comprises no amino groups.

Examples here are methylamine, ethylamine, propylamine, isopropylamine, n-butylamine, sec-butylamine, isobutylamine, tert-butylamine, pentylamine, hexylamine, ethanolamine, propanolamine, isopropanolamine, pentanolamine, (2-methoxyethyl)amine, (2-ethoxyethyl)amine, (3-methoxypropyl)amine, (3-ethoxypropyl)amine, [3-(2-ethylhexyl)propyl]amine, 2-(2-eminoethoxy)ethanol, cyclohexylamine, aminomethylcyclohexane, aniline, benzylamine, and the like.

Examples of primary amines having one or more secondary and/or tertiary amino functions (polyamines having a (single) primary amino group) are N-methylethylene-1,2-diamine, N,N-dimethylethylene-1,2-diamine, N-ethylethylene-1,2-diamine, N,N-diethylethylene-1,2-diamine, N-methylpropylene-1,3-diamine, N,N-dimethylpropylene-1,3-diamine, N-ethylpropylene-1,3-diamine, N,N-diethylpropylene-1,3-diamine, N-methylbutylene-1,4-diamine, N,N-dimethylbutylene-1,4-diamine, N-methylpentylene-1,5-diamine, N,N-dimethylpentylene-1,5-diamine, N-methylhexylene-1,6-diamine, N,N-dimethylhexylene-1,6-diamine, N-methyldiethylenetriamine, N,N-dimethyldiethylenetriamine, N-methyltriethylenetetramine, N,N-dimethyltriethylenetetramine, N-methyltetraethylenepentamine, N,N-dimethyltetraethylenepentamine, (3-(methylamino)propyl)(3-aminopropyl)amine, (3-(dimethylamino)propyl)(3-aminopropyl)amine, (2-aminoethyl)ethanolamine, N-(2-hydroxyethyl)-1,3-propanediamine, N-methyldiaminocyclohexane, N,N-dimethyldiaminocyclohexane, N-methylphenylenediamine, and the like.

It is preferable to use, as component (iii.3), primary monoamines, i.e. amines having a single primary amino group, and having no further secondary or tertiary amino functions.

In another embodiment of the invention, at least one melamine derivative (component iv) is used as further starting material in component B) of the invention.

It is preferable that the melamine derivative has been selected from benzoguanamine, substituted melamines, and melamine condensates.

The melamine condensates have preferably been selected from melam, melem, melon, and higher condensates. Melam (empirical formula $C_6$—$H_9N_{11}$) is a dimeric condensate derived from 2,4-diamino-6-chloro-s-triazine with melamine. Melem (empirical formula $C_6H_6M_{10}$) is triamino-substituted tri-s-triazine (1,3,4,6,7,9,9b-heptaazaphenalene). Melon (empirical formula $C_6H_3N_9$) is likewise a heptazine.

The molar ratio of component (i) to component (ii) is preferably from 50:1 to 1:50, particularly preferably from 10:1 to 1:10, more preferably from 8:1 to 1:8, still more preferably from 4:1 to 1:8, in particular from 2:1 to 1:5, and especially from 1:1 to 1:5.

The molar ratio of component (i) to component (iii) is preferably from 10:1 to 1:50, particularly preferably from 2:1 to 1:50, more preferably from 2:1 to 1:25, still more preferably from 1:1 to 1:20, in particular from 1:2.5 to 1:15, and especially from 1:5 to 1:15.

It is particularly preferable to use components (i), (ii), and (iii) in molar ratios that comply with the following relationship: The ratio of $$\left[\frac{\text{Amount of component }(i)\text{ [mol]}}{2} + \frac{\text{Amount of component }(ii)\text{ [mol]}}{3}\right] : \text{Amount of component }(iii)\text{ [mol]}$$

is preferably in the range from 0.05:1 to 0.75:1, particularly preferably from 0.075:1 to 0.5:1, and in particular from 0.1:1 to 0.4:1.

The molar ratio of components (i) and (ii) here is preferably in the ranges stated above.

If component (iv) is used, it preferably replaces a portion of component (i). The amounts used of this material are preferably such as to replace from 1 to 75 mol % of component (i), particularly preferably from 1 to 50 mol %, and in particular from 1 to 25 mol %.

The reaction of components (i), (ii), (iii), and optionally (iv) preferably takes place in the presence of an acidic catalyst in the process of the invention.

Suitable acidic catalysts are either Brønsted acids or Lewis acids.

Suitable Brønsted acids are either inorganic acids, such as mineral acids, e.g. hydrofluoric acid, hydrochloric acid, hydrobromic acid, nitric acid, sulfuric acid, phosphoric acid, or amidosulfonic acid, or else ammonium salts, such as ammonium fluoride, ammonium chloride, ammonium bromide, or ammonium sulfate, or else organic acids, such as methanesulfonic acid, acetic acid, trifluoroacetic acid, and p-toluenesulfonic acid.

Other suitable Brønsted acids are the ammonium salts of organic amines, such as ethylamine, diethylamine, propylamine, dipropylamine, butylamine, dibutylamine, aniline, benzylamine, or melamine, and also the ammonium salts of urea.

Suitable Lewis acids are all of the halides of metals or of semimetals, where the metal or semimetal in the halide has an electron-pair vacancy. Examples of these are $BF_3$, $BCl_3$, $BBr_3$, $AlF_3$, $AlCl_3$, $AlBr_3$, ethylaluminum dichloride, diethylaluminum chloride, $TiF_4$, $TiCl_4$, $TiBr_4$, $VCl_5$, $FeF_3$, $FeCl_3$, $FeBr_3$, $ZnF_2$, $ZnCl_2$, $ZnBr_2$, $Cu(I)F$, $Cu(I)Cl$, $Cu(I)Br$, $Cu(II)F_2$, $Cu(II)Cl_2$, $Cu(II)Br_2$, $Sb(III)F_3$, $Sb(V)F_5$, $Sb(III)Cl_3$, $Sb(V)Cl_5$, $Nb(V)Cl_5$, $Sn(II)F_2$, $Sn(II)Cl_2$, $Sn(II)Br_2$, $Sn(IV)F_4$, $Sn(IV)C_4$, and $Sn(IV)Br_4$.

However, it is preferable to use Brønsted acids. Among these, preference is given to the inorganic acids, and in particular to the ammonium salts, such as ammonium chloride or ammonium bromide. Ammonium chloride is especially used.

The reaction of the components preferably takes place at elevated temperature. The reaction temperature is preferably from 40 to 300° C., particularly preferably from 100 to 250° C., and in particular from 150 to 230° C.

The reaction can be carried out either at atmospheric pressure or at elevated pressure, e.g. at a pressure of from 1 to 20 bar or from 1 to 15 bar or from 10 to 15 bar. The pressure here is often generated exclusively via the ammonia liberated during the course of the reaction, during condensation of components (i), (ii), (iii), and optionally (iv); the pressure therefore increases as the reaction proceeds and can then be adjusted to the desired value.

However, if the intention is to carry out the reaction at elevated pressure, the pressure can also be generated by way of an inert gas, e.g. via introduction of nitrogen, argon, or carbon dioxide, preferably of nitrogen. This is clearly useful in particular when the intention is to carry out the reaction at elevated pressure from the start, i.e. before any significant pressure can be produced via the ammonia formed.

The reaction pressure is in particular prescribed via the nature of the amines (component iii) used. By way of example, the reaction can be carried out at atmospheric pressure if the boiling point of the at least one amine used is above the reaction temperature. If, in contrast, the boiling point is below the reaction temperature, it is of course advantageous to carry out the reaction at elevated pressure. However, even in the case of amines with boiling point above the reaction temperature, it can sometimes be advantageous to carry out the reaction at superatmospheric pressure, for example in order to achieve a higher reaction rate. The pressure can be adjusted as desired by using superfluous ammonia discharged from the reaction zone, for example via passage through a pressure-release valve which has been adjusted to the appropriate value. If an inert gas is used to generate the pressure, the desired pressure is set by way of conventional control equipment, e.g. by way of pressure valves.

If desired, the reaction can be carried out in a suitable solvent. Suitable solvents are inert, and this means that, under the prevailing reaction conditions, they do not react with the starting materials, intermediates, or products, and that under the prevailing reaction conditions they are not themselves degraded, for example via thermal decomposition. Examples of suitable solvents are chlorinated aliphatic or aromatic hydrocarbons, e.g. methylene chloride, chloroform, dichloroethane, trichloroethane, chlorobenzene, chlorotoluene, and o-dichlorobenzene, and open-chain and cyclic ethers, e.g. diethyl ether, dipropyl ether, tert-butyl methyl ether, tert-butyl ethyl ether, tetrahydrofuran, and 1,4-dioxane, polar aprotic solvents, e.g. N,N-dimethylformamide, N,N-dimethylacetamide, dimethyl sulfoxide, and acetonitrile, and polar protic solvents, e.g. polyols or polyether polyols, e.g. ethylene glycol, propylene glycol, diethylene glycol, triethylene glycol, or polyethylene glycol. Preferred solvents are the abovementioned polyols, or, respectively, polyether polyols.

However, it is preferable that the reaction is carried out in bulk, i.e. without additional solvent. In this case, the amine (component iii) preferably serves as solvent, particularly if it is used in excess.

The reaction can be carried out by mixing all of the components and reacting them by heating to the desired reaction temperature. As an alternative, it is also possible to begin by adding a portion of the components, and to introduce the remaining constituents gradually, the sequence of addition here being of relatively little importance. However, since melamine is generally the most sparingly soluble component, it has proven successful in practice to use the other components, i.e. component (i), component (iii), optionally component (iv), and optionally the acidic catalyst and optionally the solvent, and possibly also a portion of the melamine, as initial charge, and to bring these to the desired reaction temperature, and gradually to introduce the remaining melamine, continuously or in portions.

In another method that has proved successful, particularly if component (i) is urea, some of this is not used as an initial charge but instead is gradually introduced, continuously or in portions.

The method of addition of the individual reactants is advantageously such as to ensure that they are completely dissolved, so as to maximize conversion in the condensation reaction.

The reaction is generally carried out in reaction vessels conventional for such condensation reactions, for example in heatable stirred reactors, pressure vessels, or stirred autoclaves.

The reaction mixture is generally allowed to react until a desired maximum viscosity has been reached. The viscosity can be determined by taking the specimen and using conventional determination methods, for example with a viscometer; however, a sharp increase in viscosity is often apparent visually during the course of the reaction, for example via foaming of the reaction mixture.

The reaction is preferably terminated when the viscosity of the reaction mixture is at most 100 000 mPas, e.g. from 250 to 100 000 mPas, or from 500 to 100 000 mPas, or from preferably 750 to 100 000 mPas (at 100° C.), particularly preferably at most 50 000 mPas, e.g. from 250 to 50 000 mPas, or from 500 to 50 000 mPas, or from preferably 750 to 50 000 mPas (at 100° C.), and in particular at most 10 000 mPas, e.g. from 250 to 10 000 mPas, or from 500 to 10 000 mPas, or from preferably 750 to 10 000 mPas (at 100° C.).

When no further rise in the viscosity of the reaction mixture is intended, the reaction is terminated.

The reaction is preferably terminated by lowering the temperature, preferably by lowering the temperature to <100°, e.g. from 20 to <100°, preferably to <50° C., e.g. to from 20 to <50° C.

As a function of the intended application of the resultant polycondensate, it can be necessary or desirable to work up and purify the resultant reaction mixture. Conventional methods of work-up/purification can be used, an example being deactivation or removal of the catalyst, and/or removal of solvent and of unreacted starting materials.

To remove the acidic catalyst, the resultant reaction product can by way of example be treated with a base, e.g. with sodium hydroxide solution or potassium hydroxide solution. The salts that precipitate during this process are advantageously then removed, for example via filtration. If the viscosity of the product is very high, for example more than 5000 mPas (at 25° C.), this work-up can take place at an elevated temperature, for example at least 50° C. or at least 75° C., or at least 100° C. As an alternative, or in addition, the filtration process can take place under reduced pressure.

However, the purity level of the resultant polycondensates is adequate for numerous applications, and in these cases no further work-up or purification is therefore required and the product can be introduced directly into the further intended use thereof.

The polymers B) are highly branched polymers and in essence are not crosslinked polymers.

Preferred components B) are polymers as described above which are subsequently modified.

The modification can take place by a method based on the process of EP 09179490.9 via at least one compound which, using amino groups, can enter into a condensation or addition reaction, preferably selected among aliphatic monocarboxylic acids or derivatives thereof, polycarboxylic acids or derivatives thereof, aliphatic, cycloaliphatic, or aromatic optionally capped isocyanates, aliphatic monoamines, aliphatic polyamines, amine-terminated polyethers, alkylene oxides, aldehydes, ketones, and aldehydes in combination with a CH-acidic compound or with a hydroxyaromatic compound.

Aliphatic monocarboxylic acids are preferably those having from 1 to 22 carbon atoms, e.g. formic acid, acetic acid, propionic acid, butyric acid, isobutyric acid, valeric acid, isovaleric acid, caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, tuberculostearic acid, arachic acid, behenic acid, palmitoleic acid, oleic acid, erucic acid, sorbic acid, linoleic acid, linolenic acid, elaeostearic acid, arachidonic acid, clupanodonic acid, and docosahexaenoic acid.

Suitable carboxylic acid derivatives are any of the derivatives suitable for reacting with the amino groups of the polymer from step (i) and, respectively, (ii) to give an amide bond. Among these are halides, in particular acyl chlorides, anhydrides, and esters.

The anhydrides can be either the symmetrical anhydrides or asymmetrical anhydrides. A selection of the latter is such that the "foreign" acid group can easily be displaced by the amino groups of the polymer from step (i) or (ii). Examples of suitable acid derivatives with which the abovementioned carboxylic acid can form suitable mixed anhydrides are the esters of chloroformic acid, e.g. isopropyl chloroformate and isobutyl chloroformate, or of chloroacetic acid.

Suitable esters are in particular the $C_1$-$C_4$-alkyl esters, e.g. the methyl, ethyl, propyl, isopropyl, n-butyl, sec-butyl, isobutyl, or tert-butyl esters. However, other suitable esters are those that derive from $C_2$-$C_6$ polyols, e.g. glycol, glycerol, trimethylolpropane, erythritol, pentaerythritol, and sorbitol, preference being given to the glycerol ester. If polyol esters are used, it is possible to use mixed esters, i.e. esters having different carboxylic acid radicals. Active esters are also suitable, these formally being obtained via reaction of the acid with an active-ester-forming alcohol, such as p-nitrophenol, N-hydroxybenzotriazole (HOBt), N-hydroxysuccinimide, or OPfp (pentafluorophenol).

It is preferable to use the carboxylic acids themselves (i.e. not derivatives thereof).

Examples of suitable polycarboxylic acids and derivatives thereof are α,β-dicarboxylic acids or derivatives thereof, e.g. oxalic acid, malonic acid, succinic acid, maleic acid, fumaric acid, glutaric acid, adipic acid, pimelic acid, azelaic acid, sebacic acid, sorbic acid, polyalkylene-substituted succinic acid, and derivatives thereof. Polyalkylene-substituted succinic acid is preferably polyisobutylene-substituted succinic acid, obtainable by way of example via reaction of polyisobutene with maleic anhydride under the reaction conditions of an ene reaction. The number-average molecular weight $M_n$ of the polyalkenyl radicals, especially the polyisobutenyl radicals, is preferably from 100 to 5000, particularly preferably from 200 to 1000. Reference is made to the statements above in relation to suitable acid derivatives. In the case of the dicarboxylic acid, preference is given to use of the anhydrides, preferably the internal anhydrides (i.e. succinic anhydride, maleic anhydride, adipic anhydride, etc.). Examples of suitable aliphatic, cycloaliphatic, or aromatic optionally capped isocyanates are methyl isocyanate, ethyl isocyanate, propyl isocyanate, butyl isocyanate, pentyl isocyanate, hexyl isocyanate, cyclohexyl isocyanate, phenyl isocyanate, and the like.

Suitable aliphatic monoamines are preferably primary or secondary, particularly preferably primary. Examples of these are methylamine, ethylamine, propylamine, butylamine, pentylamine, hexylamine, heptylamine, octylamine, nonylamine, decylamine, dodecylamine, [3-(2-ethylhexyl)propyl]amine, and the like.

Examples of suitable aliphatic polyamines are polyethyleneimines, polypropylene polyamines, polybutylene polyamines, polypentylene polyamines, and the like.

Reference may be made to EP 09179490.0 for other suitable modifiers.

The molding compositions of the invention can comprise, as component C), up to 70% by weight, preferably up to 50% by weight, of further additives.

Fibrous or particulate fillers C1) that may be mentioned are carbon fibers, glass fibers, glass beads, amorphous silica, calcium silicate, calcium metasilicate, magnesium carbonate, kaolin, chalk, powdered quartz, mica, barium sulfate, and feldspar, and the amounts of these that can be used are from 1 to 50% by weight, in particular from 5 to 45% by weight, preferably from 10 to 40% by weight.

Preferred fibrous fillers that may be mentioned are carbon fibers, aramid fibers, and potassium titanate fibers, particular preference being given to glass fibers in the form of E glass. These can be used as rovings or in the commercially available forms of chopped glass.

The fibrous fillers may have been surface-pretreated with a silane compound to improve compatibility with the thermoplastic.

Suitable silane compounds have the general formula:

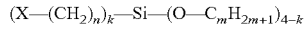

where the definitions of the substituents are as follows:

X NH$_2$—,

n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight and in particular from 0.05 to 0.5% by weight (based on E)).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may optionally have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The molding compositions of the invention can comprise, as component C2), from 0.05 to 3% by weight, preferably from 0.1 to 1.5% by weight, and in particular from 0.1 to 1% by weight, of a lubricant.

Preference is given to the salts of Al, of alkali metals, or of alkaline earth metals, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as component C3), from 0.05 to 3% by weight, preferably from 0.1 to 1.5% by weight, and in particular from 0.1 to 1% by weight, of a copper stabilizer, preferably of a Cu(I) halide, in particular in a mixture with an alkali metal halide, preferably KI, in particular in the ratio 1:4, or of a sterically hindered phenol, or a mixture of these.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising the polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogeneous solution is preferably from 0.3 to 3% by weight, in particular from 0.5 to 2% by weight, based on the total weight of the solution, and the molar ratio of cuprous iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols D3) are in principle all of the compounds which have a phenolic structure and which have at least one bulky group on the phenolic ring.

It is preferable to use, for example, compounds of the formula

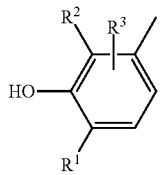

where:

R¹ and R² are an alkyl group, a substituted alkyl group, or a substituted triazole group, and where the radicals R¹ and R² may be identical or different, and R³ is an alkyl group, a substituted alkyl group, an alkoxy group, or a substituted amino group.

Antioxidants of the abovementioned type are described by way of example in DE-A 27 02 661 (U.S. Pat. No. 4,360,617).

Another group of preferred sterically hindered phenols is provided by those derived from substituted benzenecarboxylic acids, in particular from substituted benzenepropionic acids.

Particularly preferred compounds from this class are compounds of the formula

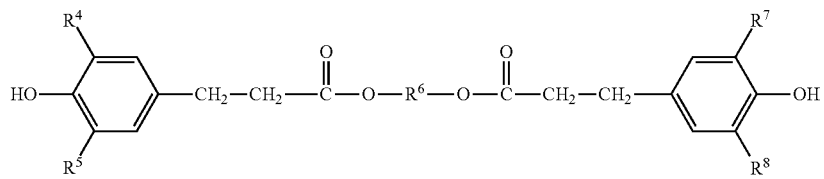

where R⁴, R⁵, R⁷, and R⁸, independently of one another, are C₁-C₈-alkyl groups which themselves may have substitution (at least one of these being a bulky group), and R⁶ is a divalent aliphatic radical which has from 1 to 10 carbon atoms and whose main chain may also have C—O bonds.

Preferred compounds corresponding to these formulae are

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxyhydrocinnamide (Irganox® 1098), and the product Irganox® 245 described above from BASF SE, which has particularly good suitability.

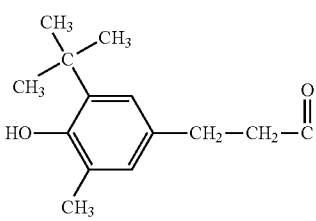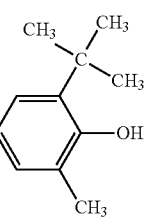

(Irganox® 245 from BASF SE)

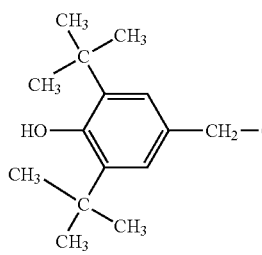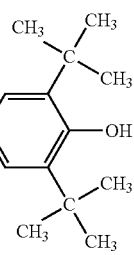

(Irganox® 259 from BASF SE)

The amount comprised of the antioxidants C), which can be used individually or as a mixture, is from 0.05 up to 3% by weight, preferably from 0.1 to 1.5% by weight, in particular from 0.1 to 1% by weight, based on the total weight of the molding compositions A) to C).

In some instances, sterically hindered phenols having not more than one sterically hindered group in ortho-position with respect to the phenolic hydroxy group have proven particularly advantageous; in particular when assessing color-fastness on storage in diffuse light over prolonged periods.

The molding compositions of the invention can comprise, as component C4), from 0.05 to 5% by weight, preferably from 0.1 to 2% by weight, and in particular from 0.25 to 1.5% by weight, of a nigrosine.

Nigrosines are generally a group of black or gray phenazine dyes (azine dyes) related to the indulines and taking various forms (water-soluble, oleosoluble, spirit-soluble), used in wool dyeing and wool printing, in black dyeing of silks, and in the coloring of leather, of shoe creams, of varnishes, of plastics, of stoving lacquers, of inks, and the like, and also as microscopy dyes.

Nigrosines are obtained industrially via heating of nitrobenzene, aniline, and aniline hydrochloride with metallic iron and $FeCl_3$ (the name being derived from the Latin niger=black).

Component C4) can be used in the form of free base or else in the form of salt (e.g. hydrochloride).

Further details concerning nigrosines can be found by way of example in the electronic encyclopedia Römpp Online, Version 2.8, Thieme-Verlag Stuttgart, 2006, keyword "Nigrosine".

The molding compositions of the invention can comprise, as component C5), from 0.001 to 20% by weight, preferably from 0.05 to 10% by weight, and in particular from 0.1 to 5% by weight, of iron powder with a particle size of at most 10 μm (d50 value), where the powder is preferably obtainable via thermal decomposition of pentacarbonyliron.

Iron occurs in a number of allotropes:
1. α-Fe (ferrite) forms space-centered cubic lattices, is magnetizable, dissolves a small amount of carbon, and occurs in pure iron up to 928° C. At 770° C. (Curie temperature) it loses its ferromagnetic properties and becomes paramagnetic; iron in the temperature range from 770 to 928° C. is also termed β-Fe. At normal temperature and at a pressure of at least 13 000 MPa, α-Fe becomes what is known as ε-Fe with a reduction of about 0.20 cm³/mol in volume, whereupon density increases from 7.85 to 9.1 (at 20 000 MPa).
2. γ-Fe (austenite) forms face-centered cubic lattices, is nonmagnetic, dissolves a large amount of carbon, and is observable only in the temperature range from 928 to 1398° C.
3. δ-Fe, space-centered, exists at from 1398° C. to the melting point of 1539° C.

Metallic iron is generally silver-white, density 7.874 (heavy metal), m.p. 1539° C., boiling point 2880° C.; specific heat (from 18 to 100° C.) about $0.5\ g^{-1}\ K^{-1}$, tensile strength from 220 to 280 N/mm². The values apply to chemically pure iron.

Industrial production of iron uses smelting of iron ores, iron slags, calcined pyrites, or blast-furnace dust, and resmelting of scrap and alloys.

The iron powder of the invention is produced via thermal decomposition of pentacarbonyliron, preferably at temperatures of from 150° C. to 350° C. The particles thus obtainable have a preferably spherical shape, therefore being spherical or almost spherical (another term used being spherolitic).

Preferred iron powder has the particle size distribution described below; particle size distribution here is determined by means of laser scattering in very dilute aqueous suspension (e.g. using a Beckmann LS13320). The particle size (and distribution) described hereinafter can optionally be obtained via grinding and/or sieving.

$d_{xx}$ here means that XX % of the total volume of the particles is smaller than the stated value.

d50 values: at most 10 μm, preferably from 1.6 to 8 μm, in particular from 2.9 to 7.5 μm, very particularly from 3.4 to 5.2 μm $d_{10}$ values: preferably from 1 to 5 μm, in particular from 1 to 3 μm, and very particularly from 1.4 to 2.7 μm d90 values: preferably from 3 to 35 μm, in particular from 3 to 12 μm, and very particularly from 6.4 to 9.2 μm.

Component B) preferably has iron content of from 97 to 99.8 g/100 g, preferably from 97.5 to 99.6 g/100 g. Content of other metals is preferably below 1000 ppm, in particular below 100 ppm, and very particularly below 10 ppm.

Fe content is usually determined via infrared spectroscopy.

C content is preferably from 0.01 to 1.2 g/100 g, preferably from 0.05 to 1.1 g/100 g, and in particular from 0.4 to 1.1 g/100 g. This C content in the preferred iron powders corresponds to that of powders which are not reduced using hydrogen after the thermal decomposition process.

The carbon content is usually determined by combustion of the sample in a stream of oxygen and then using IR to detect the resultant $CO_2$ gas (by means of a Leco CS230 or CS-mat 6250 from Juwe) by a method based on ASTM E1019. Nitrogen content is preferably at most 1.5 g/100 g, preferably from 0.01 to 1.2 g/100 g. Oxygen content is preferably at most 1.3 g/100 g, preferably from 0.3 to 0.65 g/100 g. N and O are determined via heating of the specimen to about 2100° C. in a graphite furnace. The oxygen obtained from the specimen here is converted to CO and measured by way of an IR detector. The N liberated under the reaction conditions from the N-containing compounds is discharged with the carrier gas and detected and recorded by means of TCD (Thermal Conductivity Detector) (both methods based on ASTM E1019).

Tap density is preferably from 2.5 to 5 g/cm³, in particular from 2.7 to 4.4 g/cm³. This generally means the density when the powder is, for example, charged to the container and compacted by vibration. Iron powders to which further preference is given can have been surface-coated with iron phosphate, with iron phosphite, or with $SiO_2$.

BET surface area to DIN ISO 9277 is preferably from 0.1 to 10 m²/g, in particular from 0.1 to 5 m²/g, and preferably from 0.2 to 1 m²/g, and in particular from 0.4 10 1 m²/g.

In order to achieve particularly good dispersion of the iron particles, a masterbatch may be used, involving a polymer. Suitable polymers for this purpose are polyolefins, polyesters, or polyamides, and it is preferable here that the masterbatch polymer is the same as component A). The mass fraction of the iron in the polymer is generally from 15 to 80% by mass, preferably from 20 to 40% by mass.

Examples of other conventional additives C) are amounts of up to 25% by weight, preferably up to 20% by weight, of elastomeric polymers (also often termed impact modifiers, elastomers, or rubbers).

These are very generally copolymers preferably composed of at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C.B. Bucknall, "Toughened Plastics" (Applied Science Publishers, London, UK, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM rubbers and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These dicarboxylic acid derivatives or monomers comprising epoxy groups are preferably incorporated into the rubber by adding to the monomer mixture monomers comprising dicarboxylic acid groups and/or epoxy groups and having the general formulae I or II or III or IV

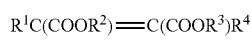 (I)

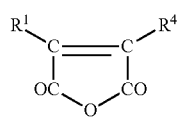 (II)

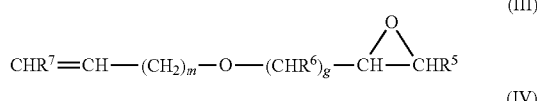 (III)

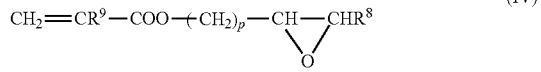 (IV)

where $R^1$ to $R^9$ are hydrogen or alkyl groups having from 1 to 6 carbon atoms, and m is a whole number from 0 to 20, g is a whole number from 0 to 10 and p is a whole number from 0 to 5.

The radicals $R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of from 50 to 98% by weight, in particular from 55 to 95% by weight, of ethylene, from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Comonomers which may be used alongside these are vinyl esters and vinyl ethers.

The ethylene copolymers described above may be prepared by processes known per se, preferably by random copolymerization at high pressure and elevated temperature. Appropriate processes are well-known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as, for example, n-butyl acrylate and 2-ethylhexyl acrylate, corresponding methacrylates, butadiene and isoprene, and also mixtures of these. These monomers may be copolymerized with other monomers, such as, for example, styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

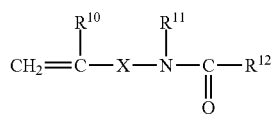

where the substituents can be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group, or —$OR^{13}$,
$R^{13}$ is a $C_1$-$C_8$-alkyl group or a $C_6$-$C_{12}$-aryl group, which can optionally have substitution by groups that comprise O or by groups that comprise N,
X is a chemical bond, a $C_1$-$C_{10}$-alkylene group, or a $C_6$-$C_{12}$-arylene group, or

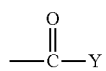

Y is O—Z or NH—Z, and
Z is a $C_1$-$C_{10}$-alkylene or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate/glycidyl acrylate or n-butyl acrylate/glycidyl methacrylate copolymers, graft polymers with an inner core composed of n-butyl acrylate or based on butadiene and with an outer envelope composed of the above-mentioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

The thermoplastic molding compositions of the invention can comprise, as component C), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples of oxidation retarders and heat stabilizers are sterically hindered phenols and/or phosphites and amines (e.g. TAD), hydroquinones, aromatic secondary amines, such as diphenylamines, various substituted members of these groups, and mixtures of these, in concentrations of up to 1% by weight, based on the weight of the thermoplastic molding compositions.

UV stabilizers that may be mentioned, the amounts of which used are generally up to 2% by weight, based on the molding composition, are various substituted resorcinols, salicylates, benzotriazoles, and benzophenones.

Materials that can be added as colorants are inorganic pigments, such as titanium dioxide, ultramarine blue, iron oxide, and carbon black, and also organic pigments, such as phthalocyanines, quinacridones, perylenes, and also dyes, such as anthraquinones.

Materials that can be used as nucleating agents are sodium phenylphosphinate, aluminum oxide, silicon dioxide, and also preferably talc.

The thermoplastic molding compositions of the invention can be produced by processes known per se, by mixing the starting components in conventional mixing apparatus, such as screw-based extruders, Brabender mixers, or Banbury mixers, and then extruding the same. After extrusion, the extrudate can be cooled and pelletized. It is also possible to premix individual components and then to add the remaining starting materials individually and/or likewise in the form of a mixture. The mixing temperatures are generally from 230 to 320° C.

In another preferred mode of operation, components B) and C) can also optionally be mixed with a prepolymer, compounded, and pelletized. The pellets obtained are then solid-phase condensed under an inert gas continuously or batchwise at a temperature below the melting point of component A) until the desired viscosity has been reached.

The thermoplastic molding compositions of the invention feature good processability together with good mechanical properties, and also markedly improved weld line strength and surface, and also thermal stability.

These materials are suitable for the production of fibers, foils, and moldings of any type. Some examples follow: cylinder head covers, motorcycle covers, intake manifolds, charge-air-cooler caps, plug connectors, gearwheels, cooling-fan wheels, and cooling-water tanks.

In the electrical and electronic sector, improved-flow polyamides can be used to produce plugs, plug parts, plug connectors, membrane switches, printed circuit board modules, microelectronic components, coils, I/O plug connectors, plugs for printed circuit boards (PCBs), plugs for flexible printed circuits (FPCs), plugs for flexible integrated circuits (FFCs), high-speed plug connections, terminal strips, connector plugs, device connectors, cable-harness components, circuit mounts, circuit-mount components, three-dimensionally injection-molded circuit mounts, electrical connection elements, and mechatronic components.

Possible uses in automobile interiors are for dashboards, steering-column switches, seat components, headrests, center consoles, gearbox components, and door modules, and possible uses in automobile exteriors are for door handles, exterior-mirror components, windshield-wiper components, windshield-wiper protective housings, grilles, roof rails, sunroof frames, engine covers, cylinder-head covers, intake pipes (in particular intake manifolds), windshield wipers, and also external bodywork components.

Possible uses of improved-flow polyamides in the kitchen and household sector are for the production of components for kitchen devices, e.g. fryers, smoothing irons, knobs, and also applications in the garden and leisure sector, e.g. components for irrigation systems, or garden devices, and door handles.

EXAMPLES

I. Use of Various Melamine Polymers in Polyamide

The following components were used:

Component A

Nylon-66 with intrinsic viscosity IV of 148 ml/g, measured on a 0.5% strength by weight solution in 96% strength by weight sulfuric acid at 25° C. to ISO 307. (Ultramid® A27 from BASF SE was used.)

Components B

Amine number was determined to DIN 53176. Viscosity was determined with a rheometer (Physica MCR51 from Anton Paar GmbH, Graz, Austria). To determine solubility the product and the solvent were mixed in a ratio by weight of 10:90 and heated with a heat gun. The product is regarded as soluble if it does not precipitate on cooling.

B/1 Production of a Highly Branched Melamine-tetraethylenepentamine Polymer 1855 g≙9.8 mol of tetraethylenepentamine were used as initial charge, and 121.9 g≙2.28 mol of ammonium chloride were admixed as catalyst, and nitrogen at a low flow rate was applied. 441 g≙3.5 mol of melamine were added in 4 portions. After each melamine addition here, the reaction mixture was heated to 200° C. and stirred until the melamine had dissolved. After dissolution, the mixture was first cooled to 100° C. before the next portion was added. After addition of the final portion, the reaction mixture was stirred at 200° C. until no further viscosity rise (about 20 000 mPas at 75° C.) occurred. After cooling, the catalyst was neutralized with 50% strength sodium hydroxide solution, and sodium hydroxide formed here was removed by filtration by way of a pressure filter funnel at 90° C. A yellow polymer was obtained, with the following properties:

Viscosity (75° C.)η=3800 mPas

Solubility: HFIP (=hexafluoroisopropanol), water

Amine number: 677.7 mg KOH/g

GPC: $M_w$=13400 g/mol $M_n$=5100 g/mol

B/2 Production of a Functionalized, Highly Branched Melamine Polymer 2.8 mol of pentaethylenehexamine were used as initial charge, and 0.65 mol of ammonium chloride were admixed as catalyst, and nitrogen at a low flow rate was applied. 1 mol of melamine was added in 4 portions of 0.25 mol. After each melamine addition here, the reaction mixture was heated to 200° C. and stirred until the melamine had dissolved. After dissolution, the mixture was first cooled to 100° C. before the next portion was added. After addition of the final portion, the reaction mixture was stirred at 200° C. until no further viscosity rise (about 20 000 mPas at 75° C.) occurred. After cooling, the catalyst was neutralized with 50% strength sodium hydroxide solution, and sodium hydroxide formed here was removed by way of a pressure filter funnel at 90° C. A yellow polymer was obtained, with the following properties:

Viscosity (75° C.)η=3250 mPas

GPC (HFIP) $M_n$=6300, $M_w$=24 400

Solubility: HFIP (=hexafluoroisopropanol), water

Amine number: 665 mg KOH/g

The resultant polymer was used as initial charge in a flask and 0.2 mol of oleic acid were admixed. The mixture was heated to 120 and the resultant water of reaction was removed by distillation. The temperature was increased stepwise here to 180° C. Once no further water was formed, stirring was continued for a further hour at 180° C. This gave a dark yellow polymer that flowed like honey and had the following properties:

Viscosity (75° C.)η=1500 mPas

Solubility: HFIP (=hexafluoroisopropanol), water

Prior to compounding, components B/1 and B/2 were dried for 24 hours at 80° C. in vacuo.

Component C/1
Glass fibers
Component C/2
Calcium stearate
Component C/3
CuI/KI in a ratio of 1:4 (masterbatch of strength 20% in PA6)
Component C/4
40% strength PA6 masterbatch with nigrosin The molding compositions were produced in an ZSK 30 at throughput 25 kg/h and with a flat temperature profile at about 260° C.

The following tests were carried out:

Tensile test to ISO 527, mechanical properties prior to and after heat-aging at 200 and, respectively, 220° C. in a convection oven IV: c=5 g/l in 96% strength sulfuric acid, ISO 307

Injection pressure was determined as pressure at the changeover point during injection molding of tensile specimens to ISO 527.

The tables give the constitutions of the molding compositions and the results of the tests.

Constitutions:

| Ex. | A (%) | C/1 (%) | C/2 (%) | C/3 (%) | C/4 (%) | B1 (%) | B2 (%) | Injection pressure (bar) | IV (ml/g) |
|---|---|---|---|---|---|---|---|---|---|
| 1 comp | 67.45 | 30 | 0.35 | 0.3 | 1.9 | 0 | 0 | 327 | 153 |
| 1 | 66.95 | 30 | 0.35 | 0.3 | 1.9 | 0.5 | 0 | 249 | 148 |
| 2 | 66.95 | 30 | 0.35 | 0.3 | 1.9 | 0 | 0.5 | 259 | 140 |

Mechanical Properties after Heat-aging at 220° C.

| Example | 0 h | 250 h | 500 h | 750 h |
|---|---|---|---|---|
| | Modulus of elasticity [MPa] | | | |
| 1 comp | 9830 | 10580 | 10200 | 8400 |
| 1 | 9950 | 10500 | 10430 | 10150 |
| 2 | 9890 | 10660 | 10440 | 9930 |
| | (Tensile stress at break) [MPa] | | | |
| 1 comp | 187 | 158 | 121 | 71 |
| 1 | 192 | 182 | 154 | 128 |
| 2 | 191 | 177 | 147 | 113 |
| | (Tensile strain at break) [%] | | | |
| 1 comp | 3.4 | 1.8 | 1.4 | 1.0 |
| 1 | 3.0 | 2.3 | 1.8 | 1.5 |
| 2 | 2.9 | 2.2 | 1.7 | 1.4 |

Mechanical Properties after Heat-aging at 200° C.

| Example | 0 h | 250 h | 500 h | 750 h | 1000 h |
|---|---|---|---|---|---|
| | Modulus of elasticity [MPa] | | | | |
| 1 comp | 9830 | 10310 | 10420 | 10330 | 10320 |
| 1 | 9950 | 10520 | 10460 | 10230 | 10200 |
| | (Tensile stress at break) [MPa] | | | | |
| 1 comp | 187 | 172 | 146 | 141 | 129 |
| 1 | 192 | 185 | 166 | 160 | 140 |
| | (Tensile strain at break) [%] | | | | |
| 1 comp | 3.4 | 2.2 | 1.7 | 1.6 | 1.5 |
| 1 | 3.0 | 2.3 | 1.9 | 1.9 | 1.6 |

II. Combination of Melamine Polymers with Iron Powder

Components A/1, A/4, B1, and C1 to C4 are the same as in I.

Component C5 used was:

Iron powder with CAS no. 7439-89-6. For determination of Fe, C, N, and O content, see pages 32-34 of the description.

| Fe | g/100 g | min. 97.7 | IR detection |
|---|---|---|---|
| C | g/100 g | max. 1.0 | IRS |
| N | g/100 g | max. 1.0 | TCD |
| O | g/100 g | max. 0.6 | IRS |

Particle size distribution: (laser scattering using Beckmann LS13320)

$d_{10}$ from 1.4 to 2.7 µm
$d_{50}$ from 2.9 to 4.2 µm
$d_{90}$ from 6.4 to 9.2 µm BET surface area 0.44 m$^2$/g (DIN ISO 9277)

The production process and the test methods were the same as in I.

The constitution of the molding compositions was:

54.75% by weight of A/1
10% by weight of A/4
0.5% by weight of B/1
30% by weight of C/1
0.35% by weight of C/2
1.5% by weight of C/3
1.9% by weight of C/4
1% by weight of C/5

Mechanical Properties after Heat-aging at 200° C.

| Ex. | 0 h | 500 h | 1000 h | 1500 h | 2000 h | 2500 h | 3000 h |
|---|---|---|---|---|---|---|---|
| | Modulus of elasticity (MPa) | | | | | | |
| 1 | 9600 | 10100 | 10320 | 10100 | 10500 | 10100 | 9400 |
| | Tensile stress at break [MPa] | | | | | | |
| 1 | 181 | 185 | 173 | 167 | 154 | 141 | 122 |
| | Tensile strain at break [%] | | | | | | |
| 1 | 3.3 | 2.7 | 2.4 | 2.4 | 2.1 | 1.8 | 1.6 |

Mechanical Properties after Heat-aging at 220° C.

| Ex. | 0 h | 500 h | 1000 h | 1500 h | 2000 h | 2500 h | 3000 h |
|---|---|---|---|---|---|---|---|
| | Modulus of elasticity (MPa) | | | | | | |
| 1 | 9600 | 10350 | 10200 | 10400 | 10500 | 10400 | 10600 |
| | Tensile stress at break [MPa] | | | | | | |
| Bsp. | 0 h | 500 h | 1000 h | 1500 h | 2000 h | 2500 h | 3000 h |
| 1 | 181 | 151 | 160 | 165 | 175 | 177 | 175 |
| | Tensile strain at break [%] | | | | | | |
| Ex. | 0 h | 500 h | 1000 h | 1500 h | 2000 h | 2500 h | 3000 h |
| 1 | 3.3 | 1.8 | 2.0 | 2.6 | 2.8 | 2.7 | 2.8 |

The invention claimed is:

1. A thermoplastic molding composition, comprising
   A) from 10 to 98% by weight of a thermoplastic polyamide,
   B) from 0.01 to 20% by weight of a highly branched melamine polymer or melamine-urea polymer, or a mixture of these,
   C) from 0 to 70% by weight of further additives,
   where the total of the percentages by weight of components A) to C) is 100%.

2. The thermoplastic molding composition according to claim 1, comprising from 1 to 50% by weight of a fibrous or particulate additive C1.

3. The thermoplastic molding composition according to claim 1, comprising from 0.05 to 3% by weight of a copper-containing stabilizer C3.

4. The thermoplastic molding composition according to claim 1, in which the degree of branching of component B) is from 10 to 99.9%.

5. The thermoplastic molding composition according to claim 1, in which the amine number (DIN 53176) of component B) is from 100 to 900 mg KOH/g.

6. The thermoplastic molding composition according to claim 1, in which the number-average molar mass $M_n$ of component B) is from 1000 to 40 000 g/mol (GPC).

7. The thermoplastic molding composition according to claim 1, in which the weight-average molar mass $M_w$ of component B) is from 1500 to 150 000 g/mol.

8. The thermoplastic molding composition according to claim 1, comprising from 0.001 to 20% by weight of iron powder with a particle size of at most 10 μm ($d_{50}$ value) (component C5).

9. A method for producing fibers, foils, and moldings of any type comprising utilizing the thermoplastic molding compositions according to claim 1.

10. A fiber, foil, or molding, obtained by the process according to claim 9.

11. The thermoplastic molding composition according to claim 2, comprising from 0.05 to 3% by weight of a copper-containing stabilizer C3.

12. The thermoplastic molding composition according to claim 2, in which the degree of branching of component B) is from 10 to 99.9%.

13. The thermoplastic molding composition according to claim 3, in which the degree of branching of component B) is from 10 to 99.9%.

14. The thermoplastic molding composition according to claim 2, in which the amine number (DIN 53176) of component B) is from 100 to 900 mg KOH/g.

15. The thermoplastic molding composition according to claim 3, in which the amine number (DIN 53176) of component B) is from 100 to 900 mg KOH/g.

16. The thermoplastic molding composition according to claim 4, in which the amine number (DIN 53176) of component B) is from 100 to 900 mg KOH/g.

17. The thermoplastic molding composition according to claim 2, in which the number-average molar mass $M_n$ of component B) is from 1000 to 40 000 g/mol (GPC).

18. The thermoplastic molding composition according to claim 3, in which the number-average molar mass $M_n$ of component B) is from 1000 to 40 000 g/mol (GPC).

19. The thermoplastic molding composition according to claim 4, in which the number-average molar mass $M_n$ of component B) is from 1000 to 40 000 g/mol (GPC).

20. The thermoplastic molding composition according to claim 5, in which the number-average molar mass $M_n$ of component B) is from 1000 to 40 000 g/mol (GPC).

* * * * *